United States Patent
Bigelow et al.

(10) Patent No.: US 7,194,604 B2
(45) Date of Patent: Mar. 20, 2007

(54) ADDRESS GENERATION INTERLOCK RESOLUTION UNDER RUNAHEAD EXECUTION

(75) Inventors: Linda M. Bigelow, San Antonio, TX (US); Richard E. Bohn, Andover, MN (US); Brian R. Prasky, Wappingers Falls, NY (US); Charles E. Vitu, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 10/926,481

(22) Filed: Aug. 26, 2004

(65) Prior Publication Data

US 2006/0095678 A1    May 4, 2006

(51) Int. Cl.
*G06F 9/312* (2006.01)
(52) U.S. Cl. ..................... 712/219; 712/207
(58) Field of Classification Search ............. 712/219, 712/207
See application file for complete search history.

(56) References Cited

U.S. PATENT DOCUMENTS

| 5,442,767 | A | * | 8/1995 | Eickemeyer et al. | 711/1 |
| 5,915,117 | A | * | 6/1999 | Ross et al. | 710/262 |
| 6,957,304 | B2 | * | 10/2005 | Wilkerson | 711/137 |
| 2004/0128448 | A1 | * | 7/2004 | Stark et al. | 711/137 |

* cited by examiner

*Primary Examiner*—Eric Coleman
(74) *Attorney, Agent, or Firm*—Lynn L. Augspurger

(57) ABSTRACT

Disclosed is a method and apparatus providing a microprocessor the ability to reuse data cache content fetched during runahead execution. Said data is stored and later retrieved based upon the instruction address of an instruction which is accessing the data cache. The reuse mechanism allows the reduction of address generation interlocking scenarios with the ability to self-correct should the stored values be incorrect due to subtleties in the architected state of memory in multiprocessor systems.

12 Claims, 5 Drawing Sheets

FIGURE 2

| Cycle | D 213 | AA 212 | C1 211 | C2 | EX |
|---|---|---|---|---|---|
| 1 | $I_3$ 224 | $I_2$ 223 | $I_1$ 222 | 221 | |
| 2 | $I_4$* 235 | $I_3$* 234 | $I_2$* 233 | $I_1$ 232 | 231 |
| 3 | $I_5$* | $I_4$* | $I_3$* | $I_2$* | $I_1$ |
| ... | 244 | 243 | 242 | 241 | |
| n | $I_4$ | $I_3$ | $I_2$ | $I_1$ | |
| | | | | | |

ADDRESS GENERATION INTERLOCK RESOLUTION UNDER RUNAHEAD EXECUTION

CROSS-REFERENCE TO RELATED APPLICATIONS

This application contains subject matter which is related to the subject matter of the following co-pending applications, each of which is assigned to the same assignee as this application, International Business Machines Corporation of Armonk, N.Y. Each of the below listed applications is hereby incorporated herein by reference in its entirety:

U.S. patent application Ser. No. 10/926,478, filed Aug. 26, 2006 concurrently herewith, entitled "Data Prediction for Address Generation Interlock Resolution, by Brian R. Prasky, Linda Bigelow, Richard Boirn and Charles E. Vitu.

TRADEMARKS

IBM® is a registered trademark of International Business Machines Corporation, Armonk, N.Y., U.S.A and other names used herein may be registered trademarks, trademarks or product names of International Business Machines Corporation or other companies.

BACKGROUND OF THE INVENTION

1. Field of the Invention

This invention relates to computer processing systems, and particularly to recalling calculated values produced under the technique known as runahead execution for later reuse.

2. Description of Background

A microprocessor having a basic pipeline microarchitecture processes one instruction at a time. The basic dataflow for an instruction follows the steps of: decode, address generation, cache access, register read/cache output, execute/write back. Each stage within a pipeline occurs in order and hence a given stage can not progress until the stage in front of it is progressing. In order to achieve highest performance one instruction will enter an exit the pipeline every cycle. Whenever the pipeline has to be delayed or flushed, this adds latency which in turn negatively impacts performance with which a microprocessor carries out a task. While there are many complexities that can be added on for performance, the above sets the groundwork for data prediction.

A current trend in microprocessor design has been to increase the number of pipeline stages in a processor. By increasing the number of stages within a pipeline, the amount of logic performed in each stage of the pipeline is reduced. This facilitates higher clock frequencies and most often allows the processor's throughput to increase over a given time frame. With increasing pipeline depth, bottlenecks remain that inhibit translating higher clock frequencies into higher performance. One such bottleneck is that of address generation interlock (AGI). AGI occurs when an instruction produces a result at one segment within the pipeline which is consumed to compute an address at an earlier stage within the pipeline for a following instruction. This requires the consuming address to stall until the producing instruction completes storing its value in one of the processor's registers. Traditional approaches to solving this problem have included providing bypass paths in the pipeline to allow use of produced data as early as possible. This has its limits, and deepening pipelines will increase the number of cycles until the earliest time the data is available in the pipeline. The problem remains of how to remove the remaining stalls created in the pipeline that adversely affect performance.

For an in-order pipeline, whenever the pipeline stalls because of a dependency, early parts of the pipeline are prevented from progressing past the stalled instruction within the given pipeline for if such was permitted the instructions would become out-of-order. Without specifically designing for the occurrence of out-of-order, data integrity will be introduced into the machine. Code has limitations to the amount of parallelism, non-dependent items, that can be processed in a given time frame. This lack of full parallelism in turn creates stalls within the pipeline. One such example is instructions which acquire operand data from memory. In the ideal case, the data content will be in a close local memory, ideally the first level of data cache. In cases where the data is not in the local data cache, the data request must go out to the memory hierarchy to acquire the required content. Going to larger and further out levels of memory requires further time and this addition of time from the dependency creates a long stall in the pipeline of the in-order microprocessor. Under such scenarios, the processor can go into a mode known as runahead. Runahead is where the processor is allowed to continue progressing forward, even though there is a dependency in the pipeline. Because this forward movement causes the pipeline to get out-of-order, which in turn can create data integrity problems, the architected state of the machine can not be updated. By allowing the pipeline of the machine to move forward, but not updating the architected state of the machine implies multiple items. First, the operations performed under the stall must be repeated when the dependency has been resolved. Second, because the architected state of the machine is not being updated, data integrity issues are prevented from arising. Third, by allowing the pipeline to runahead, additional cache misses can be found and the search through the memory hierarchy for the data content of concern can be set in motion earlier. This concept of allowing the pipeline to move temporary move forward under a data cache miss is known as runahead.

SUMMARY OF THE INVENTION

The shortcomings of the prior art are overcome and additional advantages are provided through the provision of a method of utilizing values produced by instructions running under runahead execution. These values are stored in a table indexed by the address of said instruction, to be retrieved when the instruction is again executed during normal execution.

While values stored under runahead execution can be used for many things, they are especially useful for resolving an effect known as address generation interlock. Address generation interlock (AGI) occurs when a value produced by the cache is needed by an instruction that makes an additional fetch to the cache based on that produced value. Due to multi-cycle cache access latencies, said instruction may need to stall for one or more cycles until the value produced by the cache is ready. Prior art has attempted to minimize the effect of AGI by providing bypass paths, through which values can be forwarded prior to those values being written to a processor's register file. While this prior art can reduce the effect of AGI, it can not remove the effect of AGI occurrences completely. The invention described herein utilizes values stored under runahead execution to completely remove the effect of some AGI occurrences.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates the concept of runahead execution.

The detailed description explains the preferred embodiments of the invention, together with advantages and features, by way of example with reference to the drawings.

DETAILED DESCRIPTION OF THE INVENTION

The mechanism described herein stores address generation data inputs with respect to a data cache output as calculated during runahead execution in a history table and then uses that stored data to avoid an effect known as address generation interlock 450.

Prior to this invention, the primary benefit of runahead execution was the ability to make very accurate memory prefetches, hiding much of the latency associated with cache misses. Whenever a cache miss occurs for a given instruction 221 the processor does not need to stall, but instead can move forward to search for other cache missing data fetches. The invention described herein takes advantage of the runahead execution stream 222, 223, 224, by searching for occurrences of address generation interlock as well as additional cache misses and remembering any values that can be used to avoid address generation interlock (AGI) under normal execution. Normal execution is defined as when the pipeline is progressing forward and the architected state of the machine is permitted to be updated.

Figure 1:
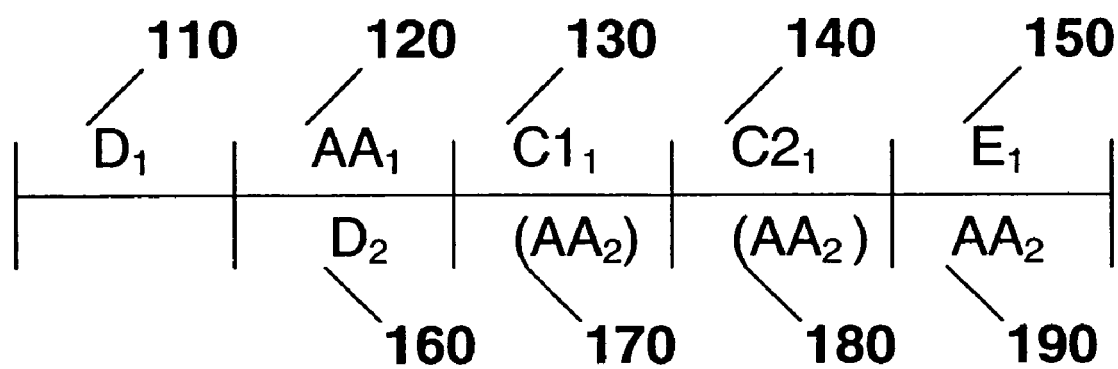
FIG. 1 illustrates the basic pipeline of a microprocessor.
Figure 3:
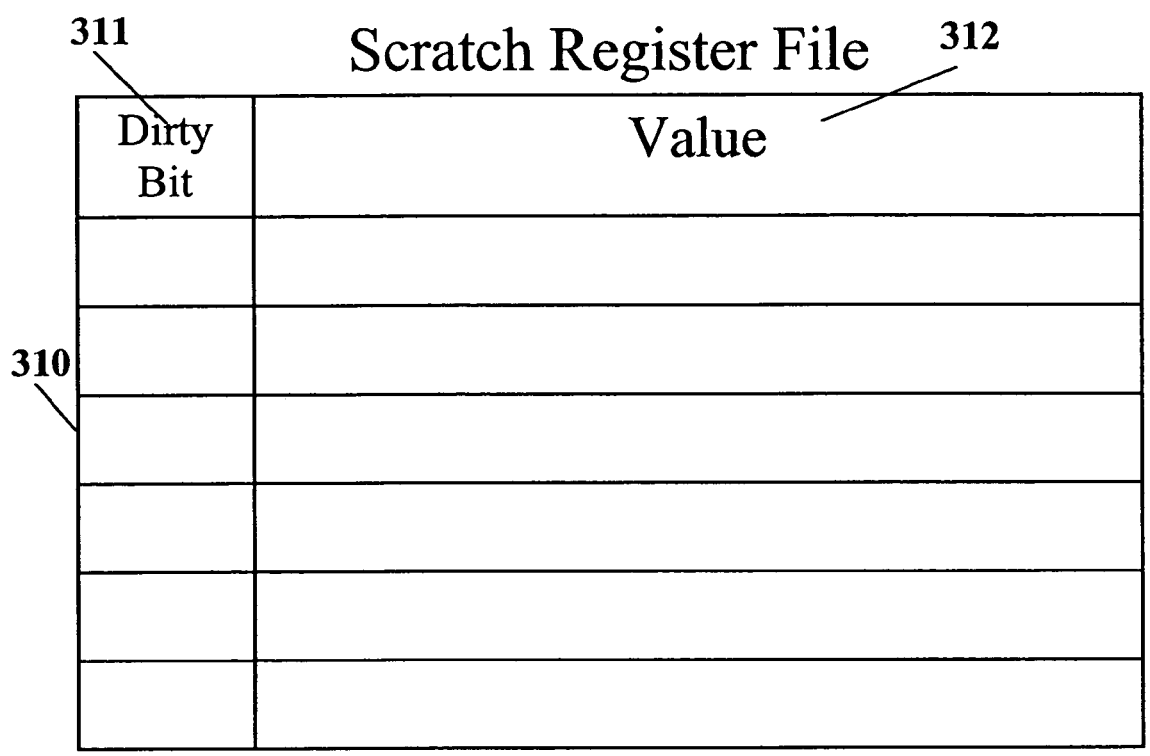
FIG. 3 illustrates the scratch register file.
Figure 4:
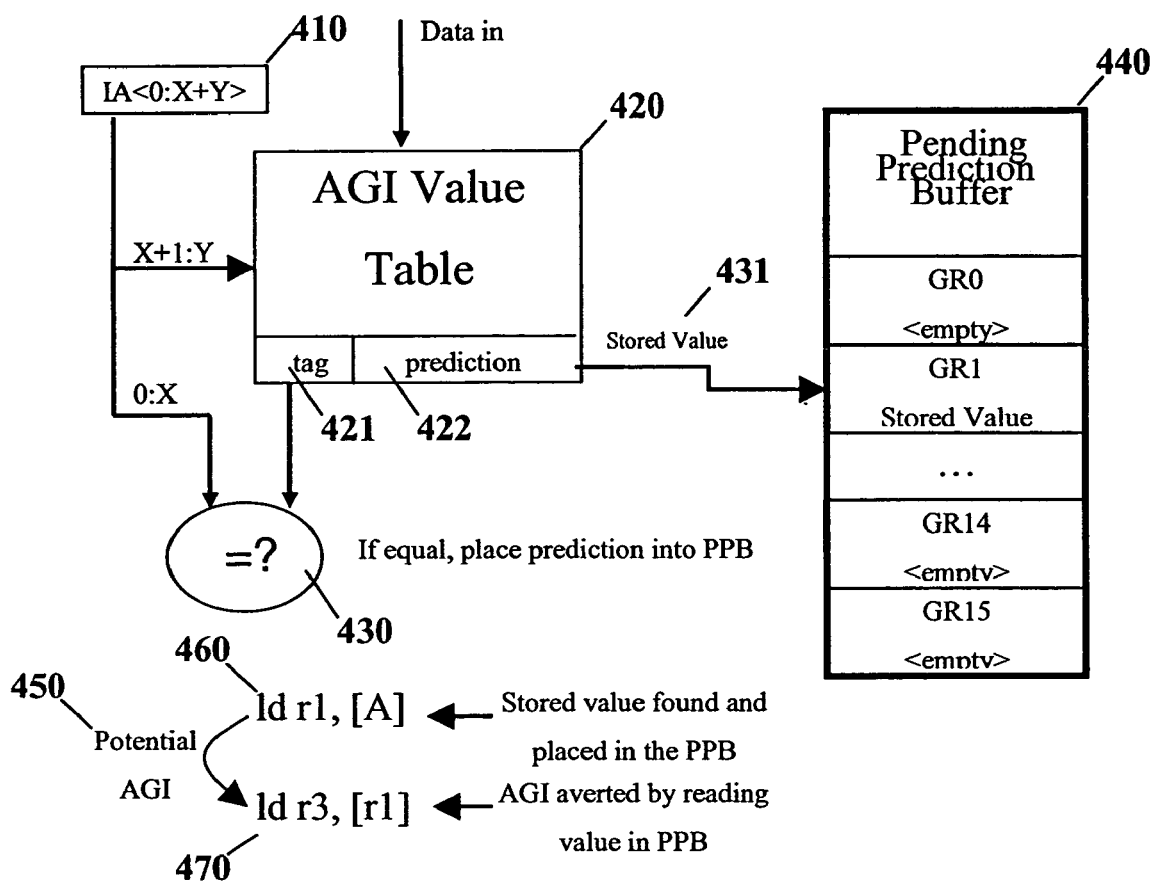
FIG. 4 illustrates the consumption mechanism for stored values.
Figure 5:
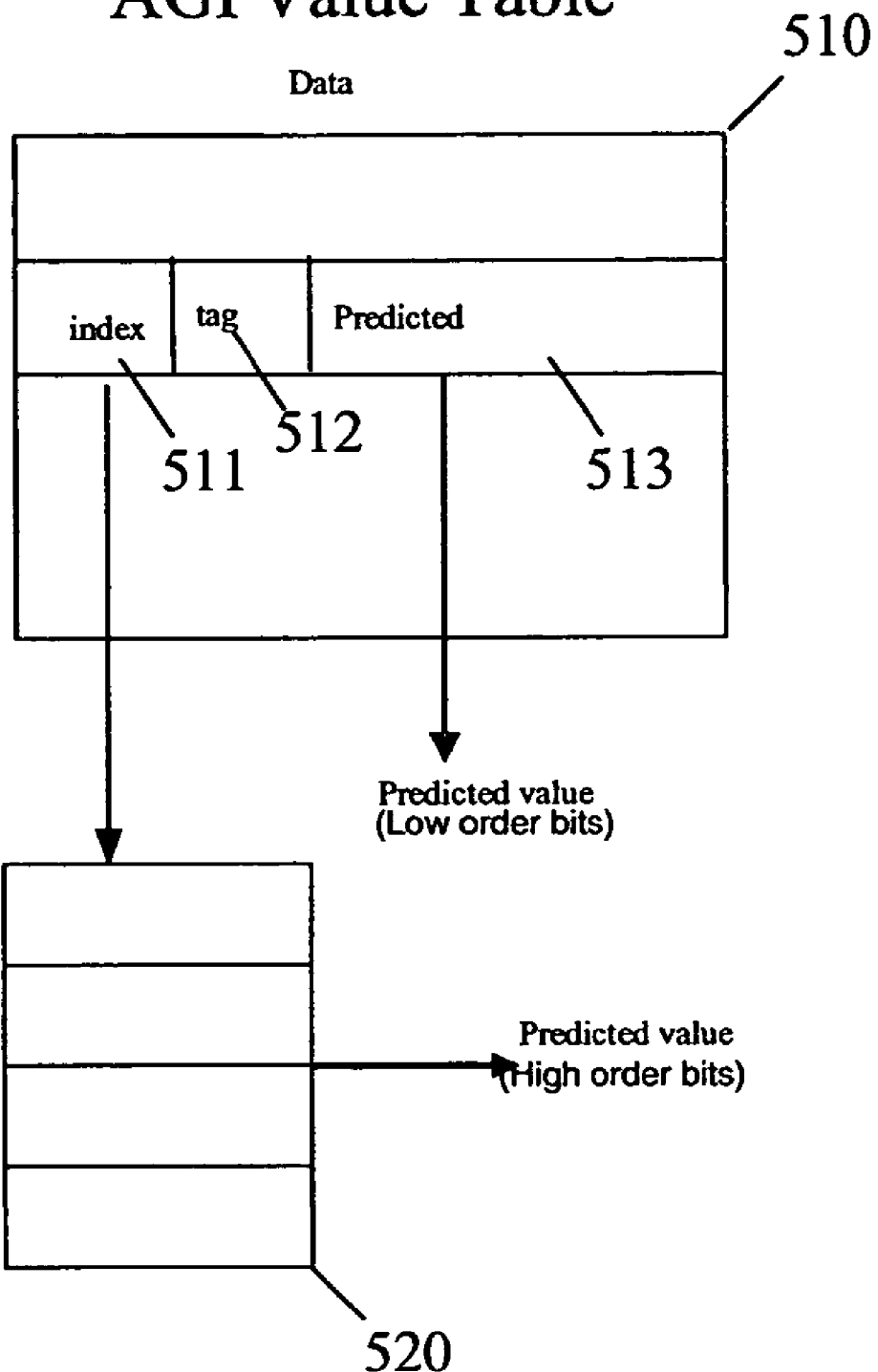
FIG. 5 illustrates the compression mechanism applied to the stored values.

AGI occurs when an instruction produces a result near the end of a pipeline that is needed to compute an address at the beginning of the pipeline Given a 5-stage pipeline, for example, where the instruction is first decoded 110 and in the second stage an address is computed 120 to index the data cache. In the third cycle the data cache is accessed 130 and the output is available in the fourth cycle 140. Fixed point calculations take place in the fifth cycle 150 along with writing the results back to storage. If a second instruction is decoded 160 behind the first instruction where the address computation 170 is dependent on the first result via either the data cache output 140 or the execution result 150, then the penalty is referred to address generation interlock. In such cases address generation (AA) is delayed 170, 180 to align the address generation/adder cycle 190 up to the time frame the contents are available. In FIG. 1, the address adder 190 is lined such that it is awaiting the contents of the data cache 140 as accessed by the prior instruction. When in runahead execution, the invention detects leading instructions 460 in AGI occurrences and stores the values they produce for later use when the cache miss that started runahead execution is resolved. In this way, some AGI stalls are hidden under the cache miss stall. Once normal execution resumes and the same AGI occurrences 450 are encountered again, the values that were saved during runahead execution 431 are utilized to resolve the AGI occurrence. This value will be correct in most, but not all cases. Due to some memory models of multiprocessor systems, loads executed out-of-order are not guaranteed to be correct. Since loads executed in runahead mode are essentially executed out-of-order, whenever an AGI occurrence is resolved using data from memory, the resolved value could be wrong and must only be considered as a prediction. This prediction can still be utilized to resolve an AGI occurrence, but it must be checked against the actual values fetched during normal execution, with the possibility of making an incorrect prediction and needing to roll back the state of the machine to a known-correct point of execution.

Runahead execution begins when a cache miss occurs. All instructions 212, 213 following the instruction 211, 221, 231 that missed in the cache become part of the runahead execution stream. Runahead execution 222, 223, 224, 232, 233, 234, 235 continues until the data cache miss that caused the runahead execution stream 221 to begin returns the requested data. At this point, runahead execution 241 stops and normal execution 241, 242, 243, 244, resumes where it left off. During runahead execution, additional fetches 233 to the cache are made which allow much of the latency associated with memory stalls hidden by servicing multiple cache requests in parallel. For correctness and simplicity, runahead execution is not allowed to update the architectural state of the machine, so the state of architected registers and memory needs to be the same before and after runahead execution. For this reason, a scratch register file 310 may be necessary to store intermediate values 312 computed during runahead execution. Not all architected registers may be used to make forward progress in runahead execution, however. There may be registers whose values are not known because they are in some way dependent on the cache-missing instruction that initiated runahead execution. To keep track of which register values are known and which aren't, each entry in the scratch register file has a bit 311 to indicate whether or not it is "dirty." A dirty register is any register whose value was dependent upon the cache-missing instruction that initiated runahead execution. Under runahead execution, any instructions that write to the scratch register file will set their destination registers' dirty bit 311 if any of the registers they used to compute their values had their dirty bits set. Otherwise, they will clear their destination registers' dirty bits. In runahead execution, any potential data cache fetches are not made if the registers used to compute the fetch address are marked as dirty 311. In this way, incorrect data cache fetches that could evict valid data out of a lower-level cache are avoided.

The mechanism to store leading AGI leading instructions resolved under runahead execution consists of two structures. One is the AGI Value Table (AVT) 420, 510 and the other is the Pending Prediction Buffer (PPB) 440. The AVT is a small table indexed by Instruction Address (IA) 410. During runahead execution, when an instruction 460 that produces a leading value is detected, the value produced by that instruction is stored in the AVT 420. This storage into the AVT will be blocked in cases whereby the leading instruction 460 in an AGI occurrence utilized registers with set dirty bits 311 in computing values. Using these values would not aid performance as these values have a strong probability of being incorrect. For each instruction decoded, its instruction address will be used to index the AVT. When a tag 421, 512 match 430 occurs, a prediction 422 is generated. When a prediction is generated it is possible that the predicted value may need to be used by several trailing instructions in order to remove all AGI. For this reason, the values saved in runahead execution in the AVT is placed from the AVT in to the PPB until either the leading instruction reaches a point in the pipeline where a saved value is no longer needed to resolved AGI, or an instruction is processed which writes to the general register for which a stored value is a prediction. In other words, whenever an instruction writes to a general purpose register, or passes an appropriate bypass point, it should invalidate any associated prediction value in the PPB. Trailing instructions 470 can then check the PPB 440 to determine if there is a prediction waiting for them. If there is, execution can then continue without an AGI stall. It is important that instructions store to the PPB 440 and read from the PPB 440 in the same stage of the pipeline. If the store occurred in an earlier stage than the read, a prediction could be prematurely overwritten by another prediction. The store could happen later in the pipeline, but then instructions in an AGI 450 pair that were back-to-back would still experience one cycle of AGI stall before the predicted value is available to be read. Not limited to the description is to allow the PPB 440 to store more than one prediction per architected register.

In a 64-bit architecture, 64 bits could be stored in each AGI Value Table (AVT) entry 510; however, it is beneficial to store fewer bits per entry 513 when maximizing the performance advantage per transistor. The method for doing this utilizes the generalization that a set of memory references made in a 64-bit architecture will frequently not be distributed across the complete address space. Rather over a given time frame, the address locations referenced are most likely constrained to some region of the complete 64-bit address range. The high order, or most significant, bits of a value loaded from the cache that is involved in address generation is therefore frequently the same across many predictions. It is rational that there will be far fewer unique values in the high-order 32 bits for each table entry than there are table entries. Instead of storing the redundant high-order bits per each entry within the AVT 513, the high order bits can be stored in a separate structure 520 with far fewer entries. Each line in the AGI value table then replaces the high-order bits of the predicated data value with a few bits that act as an index 511 into this much smaller structure. While this causes the predictor to require additional time for producing a value, it will significantly reduce the area required by it. This additional time is rational because of the ability to access the array very early on through the use of the instruction address 210 of issue. An implementation is not limited to blocking out the higher 32-bits of a 64-bit architecture as described above but can block out X-bits where X-bits represents a value greater than 0 and less than the number of architected address bits of the machine.

Due to complexities introduced by the memory models of multiprocessor systems, values stored during runahead execution should only be used as predictions, and not architecturally correct values. Thus, it will be necessary to check values 431 used to resolve AGI occurrences 450 against the actual value that is loaded during real execution. This compare can be done as soon as the actual value of the data is produced 140. Since any AGI dependent instructions 160 trail the instruction 110 producing the consumed prediction in the pipeline, this allows sufficient time in a variety of microprocessor implementations for the compare to complete and start a pipeline flush mechanism for the trailing 160, consuming instructions. The flushing is necessary since any trailing instructions that consumed an incorrect stored value would produce incorrect results. By this flush mechanism, the mechanism to resolve AGI occurrences under runahead execution does not affect the architectural correctness of the machine since incorrect stored values can be detected and are effectively erased from program execution 150.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of storing data cache content in a microprocessor, comprising the steps of:
    recognizing in a pipeline for instructions a runahead after a data cache miss,
    and when an address generation interlock (AGI) potential penalty is encountered during the recognized runahead, a AGI pertinent data calculation used to resolve an AGI is stored in a value table (AVT) if first resolved with a pertinent data calculation and the pertinent data calculation used to resolve the AGI, and
    subsequently, when the same potential AGI penalty is encounterd outside of the runahead, an AGI which is stored after it is recognized after a cache miss is re-executed and the pertinent data calculation later retrieved based upon the instruction address of an instruction which is accessing the data cache.

2. The method according to claim 1
    wherein when the first stored pertinent data calculation stored in said value table is retrieved, a re-executed AGI calculation is compared with the stored pertinent data calculation, and
    if the re-executed AGI calculation and the first stored pertinent data calculation stored in said AVT are equivalent the pipeline is allowed to proceed forward, but if not equivalent, the pipeline is flushed, and an additional third AGI calculation is made without prediction and used.

3. The method according to claim 1 wherein
    values are placed into the AVT in respect to any instructions value calculation which delays another instruction from progressing forward in the pipeline.

4. The method according to claim 1 wherein
    a segment of the instruction address value of a stated instruction accessing the data cache is used to index a stored value table of stored value table content.

5. The method according to claim 1 wherein
    stored values via an AVT are placed in a pending prediction butter (PPB) thereby allowing multiple stored values to be utilized over a time frame where such values can prevent the microprocessor pipeline from stalling.

6. The method according to claim 1 wherein
    stored values of the AVT which are incorrect allow the pipeline to be flushed such that improper values are not released into the storage content of the computing system.

7. The method according to claim 3 where the
    AVT is written under a runahead mode.

8. The method according to claim 4 where a
portion of the address associated with a given stored value of a stated instruction is stored as a tag with the stated stored value of said stated instruction value.

9. The method according to claim 4 where the stored value table contains an index into a smaller secondary data history table for retrieving the remainder of the value that is not contained within the stored value table.

10. The method according to claim 5 wherein the pending prediction buffer (PPB) is multi-set associative allowing for processing of multiple address generation interlocks against a particular register.

11. The method according to claim 10
whereby nesting tables is limited only to the extent of the number of bits that are contained for a complete data prediction.

12. The method according to claim 8
wherein the tag is used as a mechanism to validate that an address which is accessing a given entry of the stored value table is an entry which corresponds to the address used for indexing.

* * * * *